Jan. 7, 1941.   G. STEIN ET AL   2,227,948
PRODUCTION OF EPICHLORHYDRIN
Filed Sept. 20, 1938
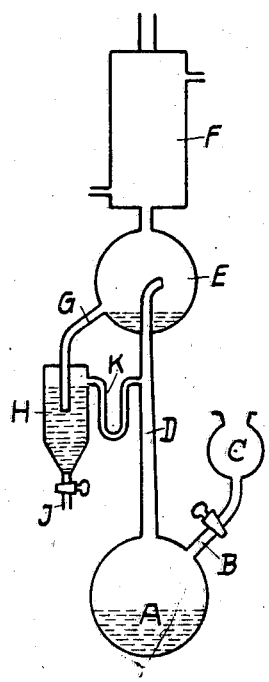
Gerhard Stein
Walter Flemming
INVENTORS
BY  Hutz and Joslin
THEIR ATTORNEYS Patented Jan. 7, 1941

2,227,948

UNITED STATES PATENT OFFICE 2,227,948

PRODUCTION OF EPICHLORHYDRIN

Gerhard Stein and Walter Flemming, Ludwigshafen-on-the-Rhine, Germany, assignors, by mesne assignments, to General Aniline & Film Corporation, New York, N. Y., a corporation of Delaware Application September 20, 1938, Serial No. 230,778
In Germany September 23, 1937

3 Claims. (Cl. 260—348)

The present invention relates to improvements in the production of epichlorhydrin.

When making epichlorhydrin in the known way by treatment of dichlorhydrin with alkalies, alkali carbonates or alkaline earth hydroxides, saponification of a part of the epichlorhydrin to form glycerine readily occurs whereby the yield of epichlorhydrin is impaired. In order to avoid this it has already been proposed to use the alkalies in a lower concentration not appreciably exceeding ⅕ normal or to allow alkali carbonates or alkaline earth hydroxides to act at from 40° to 120° C. and to remove the epichlorhydrin immediately after its formation by distillation from the reaction mass. Both methods lead, however, to satisfactory yields of epichlorhydrin only when using high concentrations of dichlorhydrin.

We have now found that epichlorhydrin can be obtained in excellent yields even from aqueous dichlorhydrin mixtures (which expression comprises solutions of $\alpha,\beta$-dichlorhydrin or $\alpha,\gamma$-dichlorhydrin or mixtures of both in water and mixtures of so much dichlorhydrin with water that the former is not completely dissolved in the water) by distilling the same with an addition of basic substances, in particular hydroxides or carbonates of the alkali or alkaline earth metals with such a speed that besides the epichlorhydrin formed water and dichlorhydrin are contained in the distilling vapors, separating from the condensate the layer insoluble in water which mainly consists of epichlorhydrin, and recycling the aqueous part of the condensate containing dichlorhydrin to the same reaction mixture from which the condensate has been obtained or to another reaction mixture of the same kind. In this way even 1 to 10 per cent mixtures of dichlorhydrin and water can be used, but mixtures containing more dichlorhydrin are also suitable for the process.

By taking care that only small amounts of unconsumed basic substances are present at any time saponification of already formed epichlorhydrin to glycerine is avoided with certainty. The whole of the basic substance may, however, be added at the beginning. It is advantageous to distil at such a rapid rate that the epichlorhydrin formed is distilled off from the liquid reaction mixture immediately after its formation and thereby withdrawn from the influence of boiling water and the basic substances. In carrying out the process in practice, the alkaline substance is preferably added at about the rate at which it is consumed and the mixture of water and dichlorhydrin is subjected to a distillation in a cycle with separation of the epichlorhydrin formed while any dichlorhydrin still unconverted and contained in the distilling vapors passes in the cycle back into the reaction chamber and may then be converted into epichlorhydrin. The process may be carried out at atmospheric or reduced pressure, but it is also possible to work under increased pressure. An apparatus suitable for carrying out the process is shown diagrammatically in the accompanying drawing, but the invention is not restricted to the particular apparatus shown. In the drawing, A is the distillation vessel into which there is introduced through the pipe B from the container C a mixture of dichlorhydrin and water and the basic substance. In the vessel A the reaction mixture is heated to boiling. The vapors rise through the tube or column D into the vessel E and then into the cooler F where they are condensed. The condensed portion flows through E and the pipe G into the separator H in which a separation into two layers takes place. The lower layer consisting of epichlorhydrin may be withdrawn through J while the upper aqueous layer of dichlorhydrin solution flows through the overflow K and the column D back into the distillation vessel A. The lower end of the pipe G is lower than the overflow pipe K so that the condensed portion flows into the liquid present in H without the condensed epichlorhydrin passing into the overflow pipe K. The liquid withdrawn at J is epichlorhydrin with only a small amount of dichlorhydrin. The epichlorhydrin is obtained in an excellent yield.

The following examples will further illustrate how the said invention may be carried out in practice but the invention is not restricted to these examples.

Example 1

38 cubic centimeters of concentrated caustic soda solution are gradually added during the course of an hour to a liter of an aqueous solution containing 62.9 grams of dichlorhydrin and the solution is distilled in the manner described above. The speed of the distillation is regulated so that 500 cubic centimeters of liquid distil over per hour. 90 per cent of the theoretical yield of epichlorhydrin is obtained.

Sodium carbonate or calcium hydroxide may be used with the same result instead of caustic soda solution.

Example 2

An aqueous solution of dichlorhydrin containing 45.2 grams of dichlorhydrin per liter is filled into the distillation vessel A of the apparatus shown in the drawing. To each liter of the solution 20 grams of slaked lime are added. The mixture is heated to boiling while maintaining in the apparatus a reduced pressure of 60 millimeters (mercury gauge). The speed of distillation is adjusted so that in one hour, for each liter of solution originally contained in the vessel 400 cubic centimeters of the liquid distil over. The process is carried out as described in the paragraph before the preamble to the examples. When the reaction is completed (which is the case after about ¾ hour) a mixture of about 29.5 grams of epichlorhydrin and 2 grams of dichlorhydrin is obtained per liter of solution employed.

What we claim is:

1. The process for the production of epichlorhydrin which comprises distilling a mixture of water and dichlorhydrin wherein the dichlorhydrin is present in concentrations of up to about 10 per cent, with the addition of basic substances, the distillation being conducted at such a speed that besides the epichlorhydrin formed, water and dichlorhydrin are contained in the distilling vapors, condensing the latter, separating from the condensate the layer insoluble in water which mainly consists of epichlorhydrin and continuously recycling and returning the aqueous part of the condensate containing dichlorhydrin to the distilling reaction mixture.

2. The process for the production of epichlorhydrin which comprises distilling a mixture of water and dichlorhydrin wherein the dichlorhydrin is present in concentrations of up to about 10 per cent while adding a basic substance at substantially the rate at which it is consumed, the distillation being conducted at such a speed that the epichlorhydrin is removed from the boiling reaction mixture immediately after its formation along with some water and dichlorhydrin, condensing the distilling vapors, separating from the condensate the layer insoluble in water which mainly consists of epichlorhydrin and continuously recycling and returning the aqueous part of the condensate containing dichlorhydrin to the distilling reaction mixture.

3. The process for the production of epichlorhydrin which comprises distilling a mixture of water and dichlorhydrin wherein the dichlorhydrin is present in concentrations of up to about 10 per cent, with the addition of basic substances, the distillation being conducted at such a speed that besides the epichlorhydrin formed, water and dichlorhydrin are contained in the distilling vapors, condensing the latter, separating from the condensate the layer insoluble in water which mainly consists of epichlorhydrin and continuously recycling and returning the aqueous part of the condensate containing dichlorhydrin to the distilling reaction mixture in countercurrent to the distilling vapors coming therefrom.

GERHARD STEIN.
WALTER FLEMMING.